United States Patent [19]
Kolodziej et al.

[11] Patent Number: 5,400,938
[45] Date of Patent: Mar. 28, 1995

[54] ROOF LOAD CARRIER FOR VEHICLES

[75] Inventors: Klaus Kolodziej; Karl-Heinz Lumpe, both of Wuppertal, Germany

[73] Assignee: Happich Fahrzeug-Dachsysteme GmbH, Wuppertal, Germany

[21] Appl. No.: 210,369

[22] Filed: Mar. 18, 1994

[30] Foreign Application Priority Data
Apr. 28, 1993 [DE] Germany ............ 43 13 885.3

[51] Int. Cl.⁶ ............................................. B60R 9/00
[52] U.S. Cl. ............................ 224/321; 224/326
[58] Field of Search .............. 224/309, 315, 321, 322, 224/325, 326, 329, 330, 331

[56] References Cited

U.S. PATENT DOCUMENTS

| | | |
|---|---|---|
| 4,618,082 | 10/1986 | Bell ........................... 224/321 |
| 4,911,348 | 3/1990 | Rasor et al. . |
| 5,104,018 | 4/1992 | Dixon . |
| 5,143,267 | 9/1992 | Cucheran et al. . |
| 5,170,920 | 12/1992 | Corrente et al. .............. 224/326 |
| 5,232,139 | 8/1993 | Cucheran ................... 224/326 |

FOREIGN PATENT DOCUMENTS
3914460 2/1989 Germany .

Primary Examiner—Linda J. Sholl
Attorney, Agent, or Firm—Ostrolenk, Faber, Gerb & Soffen

[57] ABSTRACT

A roof load carrier for a vehicle having a roof rail with an upper support surface and an inner channel which opens toward the top of the rail. The channel opening is formed by inwardly directed flanges. A transverse bar is arranged adjustably along the roof rail by a support foot. A fastening device for the foot includes a clamping plate disposed in the channel of the rail and a bolt in threaded engagement in the plate. Holes in the roof rail extend in a row parallel to the channel. The support foot has a securing pin which extends parallel to the threaded shank of the bolt, and the pin can be inserted into one of the holes in the rail to fix the location of the support foot and thus of the transverse bar along the rail.

12 Claims, 2 Drawing Sheets

ROOF LOAD CARRIER FOR VEHICLES

BACKGROUND OF THE INVENTION

The present invention relates to a roof load carrier for vehicles having two roof rails which are fixed on the surface of the roof and extend generally parallel to each other along the side edges of the surface of the roof. Each roof rail has an upper support surface and an elongated inner channel which opens toward the outside of the rail. The channel opening is formed by inwardly directed flanges in an engagement wall of the roof rails. There is a front and a rear transverse bar which are mounted adjustably on the roof rails. Each of the bars is supported on and displaceable along the supporting surface of the roof rails via support feet. Fastening devices fasten the support feet to the roof rails. Each of those devices comprises a clamping plate arranged within the channel and a headed bolt having a threaded shank, which extends through the channel opening and is in threaded engagement with the clamping plate.

In a known roof load carrier of this type, a force locked attachment is provided between the roof rails and the transverse bars. That attachment is produced in each case via the headed bolt and the clamping plate. If the vehicle is subjected to strong acceleration or deceleration, as may occur, for instance, in a collision with another vehicle or with an obstacle or else due to sudden braking, high forces act on the roof load carrier and on the transported articles fastened to it as a result of the moment of inertia. The clamp attachment does not always withstand this stress. In the extreme case, the roof load carrier may be torn off the roof of the vehicle, and the transverse carriers together with the articles being transported first sliding in the longitudinal direction of the rails.

SUMMARY OF THE INVENTION

The object of the present invention is to provide a roof load carrier which avoids the danger of the sliding of the transverse carriers along the roof rails upon strong acceleration or deceleration.

According to the invention, holes are arranged in the roof rails in a row spaced one behind the other parallel to the channel. Each support foot of a transverse carrier or bar carries a securing pin which extends parallel to the threaded shank of the bolt and can be inserted in one of the holes in each position of the transverse bar along the roof rails.

The invention retains the adjustability of the transverse bars along the roof rails, and the transverse bars are secured against displacement in the longitudinal direction of the roof rails by a form locked attachment even after reduction of the initial stress upon the setting of the material or too loose tightening of the clamping plates.

In one embodiment of the invention, the securing pin is arranged in each case at one end on a plate which rests on the support foot while its free end extends through the narrower part of a stepped hole developed in the support foot. The plate is held by the support foot by the head of the headed bolt which is in threaded engagement with the clamping plate. That plate is movable with respect to the support foot against the force of a coil compression spring which surrounds the securing pin and rests at one end against the annular surface of the stepped hole. The headed bolt bears a stop disk which secures it from being pulled out of the support foot.

DESCRIPTION OF THE DRAWINGS

Other features and advantages of the present invention will become apparent from the following description of the invention which refers to the accompanying drawings.

DETAILED DESCRIPTION OF THE INVENTION

Figure 1:
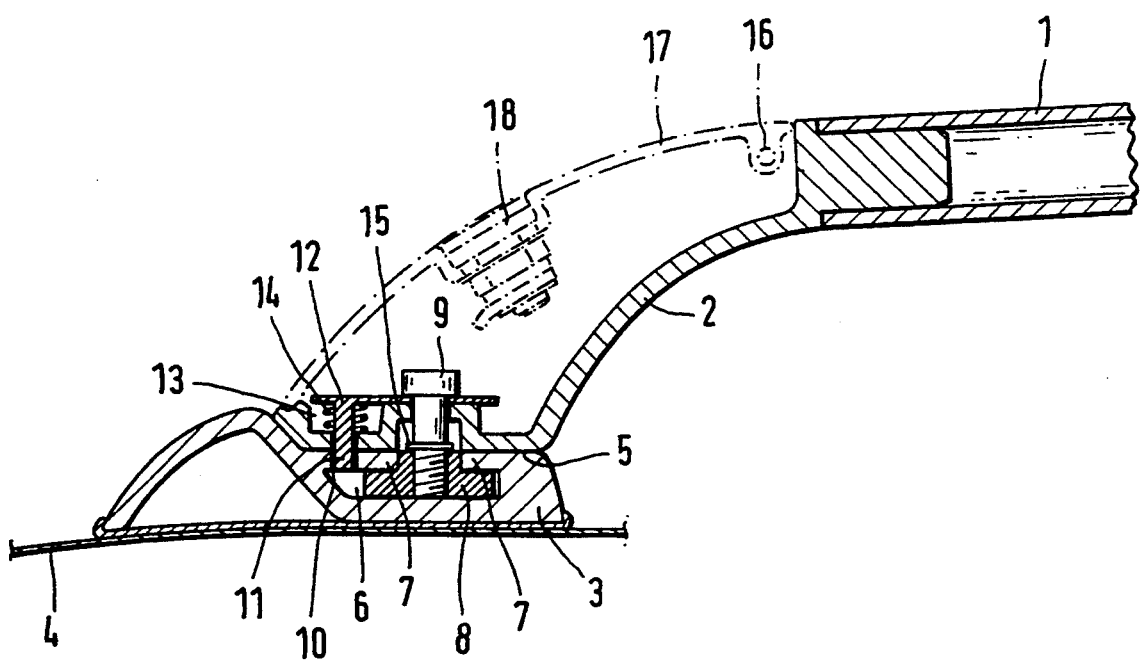
FIG. 1 shows a cross-section through an end region of a transverse bar of a vehicle roof support.

FIG. 1 shows an end region of a transverse bar 1 which is fastened via a support foot 2 to a roof rail 3. The roof rail 3 is fastened to the surface of the roof 4 of a vehicle in a manner not shown in detail. The actual roof load carrier comprises two roof rails 3 which are fastened in fixed positions on the surface of the roof and extend at least approximately parallel to each other along the side edges of the roof 4 of the vehicle and two transverse bars which are mounted adjustably along the roof rails 3. For simplicity in the drawing, only one of the roof rails 3 and one of the transverse bars 1 and also only one of the support feet 2 which connect the transverse bars 1 to the roof rails 3 have been shown.

The roof rail 3 has an upper support surface 5 and an elongated internal channel 6 which opens toward the top or outside of the rail 3. The axially continuous channel opening is formed by inwardly directed flanges 7 in an upper engagement wall of the roof rail 3. The support foot 2 is seated on the support surface 5 of the roof rail 3 and is fastened there by a fastening device. The fastening device comprises a clamping plate 8 disposed within the channel 6 and of a headed bolt 9 with a threaded shank which extends through the channel opening and is in threaded engagement in an opening in the clamping plate 8. The head of the bolt 9 rests on a plate 12, described below.

Figure 2:
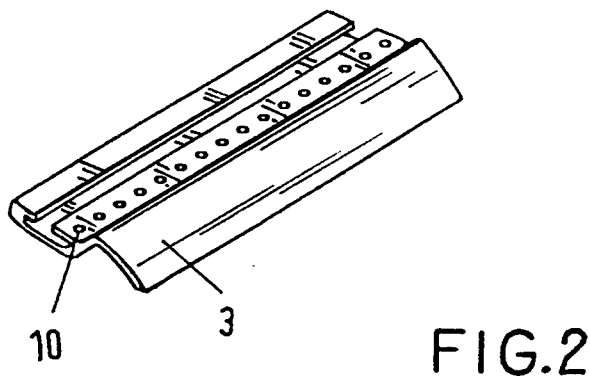
FIG. 2 illustrates one of the rails on the vehicle roof.

Holes 10 are arranged spaced apart in a row one behind the other in the roof rail 3, and the row of holes is parallel to the channel 6. Only one of the holes 10 is shown in FIG. 1, but the row thereof can be seen in FIG. 2. The transverse bar 1 and the foot 2 should be prevented from shifting along the channel opening. A securing pin 11 arranged on the support foot 2 engages into a selected hole 10 which secures the foot 2 against displacement on the roof rail 3 when the clamping plate 8 has been tightened by tightening the bolt 9.

The securing pin 11 can be arranged directly on the support foot 2 or else, as shown, on a plate 12. The free end of the pin 11 engages into a hole 10 and can pass through the narrower part of a stepped hole 13 developed in the support foot 2. The plate 12 is held on the support foot 2 by the head of the headed bolt 9, the shank of which is in threaded engagement with the clamping plate 8. The plate 12 is movable with respect to the support foot 2 against the upwardly directed force of a coil compression spring 14 which surrounds the securing pin 11. The spring rests at one end against the annular surface which helps define the stepped hole 13.

Figure 3:
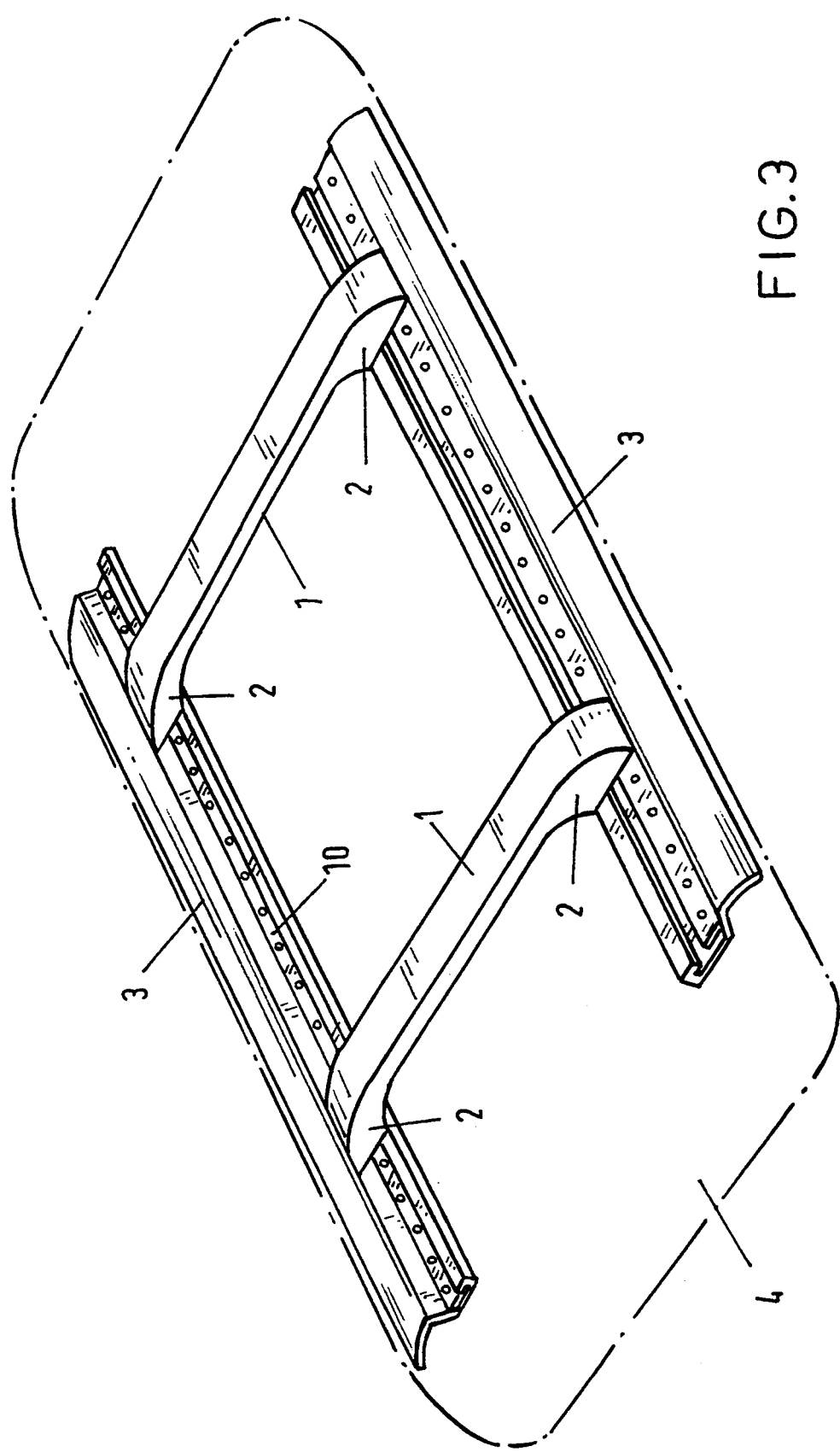
FIG. 3 is a perspective view of a full roof carrier.

One rail and one support foot 2 have been shown in detail. As shown in FIG. 3, the roof carrier has two identical rails extending front to rear on the roof and parallel to each other and two transverse bars extending between the rails. Each bar is connected to its rail by the foot and securement arrangement shown in FIG. 1.

Upon assembly, the support foot 2 is fastened on the roof rail 3 by means of the headed bolt 9. A force locked attachment of the foot 2 to the rail 3 is produced via the clamping plate 8 and the bolt 9. At the same time, the plate 12 is pressed against the compression spring 14 by the head of the headed bolt 9. The securing pin 11 is thereby pushed into one of the holes 10 along the roof rail 3 and thus secures the transverse bar 1 against displacement in the longitudinal direction. Upon loosening of the bolt 9, the plate 12 is moved upward together with the securing pin 11 by the compression spring 14 until the pin 12 leaves the hole 10 in the rail so that displacement of the transverse bar 1 is thereafter possible. A stop disk 15 is seated on the shank of the bolt 9. It prevents the compression spring from pressing the plate 12 out of the recess provided for it in the support foot 2 because the bolt head holds down the plate 12 while the disk 15 holds the bolt in place.

There is a cover 17 with a lock 18. The cover is swingable around the pivot 16. The cover and the lock provide anti-theft protection over the bolt 9 and pin 11.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A roof load carrier for a vehicle, the carrier comprising:
   a rail which is fixable to the surface of the vehicle roof along a side edge of the roof, the rail having an upper support surface, and an elongate inner channel in and extendable along the rail, the channel having an opening outward toward the support surface of the roof rail;
   a transverse bar for being adjustably mounted in a position along the rail and for extending laterally from its mounting on the rail, the position of the transverse bar being displaceable on the support surface of the rail; a support foot on the transverse bar at the rail, and the foot including a foot surface which rests on the support surface of the rail;
   a fastening device for fastening the support foot to the rail, the fastening device comprising:
   a clamping plate disposed in the channel of the rail and having a threaded opening therein; a fastening bolt, including a head for being supported by the support foot of the transverse bar, and including a threaded shank which extends into the channel and into the opening in the clamping plate for being tightened in the threaded opening such that tightening of the bolt into the clamping plate tightens the boot head against the support foot and moves the clamping plate and the head of the bolt to clamp the foot and the rail;
   a plurality of holes arranged in a row in the rail, generally parallel to the channel and located to the side of the bolt;
   a securing pin on the support foot which extends into a selected one of the holes in the rail for additionally securing the foot and the transverse bar against shifting along the channel and the rail.

2. The roof load carrier of claim 1, wherein the bolt head is above the support surface of the rail.

3. The roof load carrier of claim 2, wherein the upper support surface of the rail has inwardly directed flanges which define a narrowed opening through the upper support surface into the channel of the rail, the bolt extending through the channel defined between the flanges; and the clamping plate being narrower than the channel defined between the flanges, whereby upon tightening of the bolt, the clamping plate is drawn against the flanges in the channel.

4. The roof load carrier of claim 2, wherein the securing pin extends parallel to the threaded shank of the bolt and the holes in the rail are oriented to receive the pin so directed.

5. The roof load carrier of claim 2, further comprising a securing plate on the support foot, and the tightened bolt holding the securing plate to the support foot;
   the securing pin being attached on the securing plate;
   a spring biasing the securing plate and along with the securing plate biasing the pin out of the hole; the tightened bolt acting on the securing plate in opposition to the spring for holding the pin in the hole; and upon loosening of the bolt, the pin being urged by the spring out of the hole.

6. The roof load carrier of claim 5, wherein the securing pin extends parallel to the threaded shank of the bolt and the holes in the rail are oriented to receive the pin so directed.

7. The roof load carrier of claim 5, wherein the spring comprises a coil compression spring which surrounds the securing pin and at one end presses on the securing plate and at the other end engages the support foot to bias the securing plate.

8. The roof load carrier of claim 7, wherein the foot has a stepped width hole therethrough toward the support surface of the rail, the stepped hole having a narrow portion toward the rail and a wider portion away from the rail; the pin being shaped to fit through the narrow portion of the stepped hole; and the compression spring resting on the foot in the wider portion of the stepped hole.

9. The roof load carrier of claim 8, further comprising a stop disk on the bolt engageable on the support foot for preventing the bolt from being pulled out of the support foot or from being urged thereout by the compression spring applying force to the securing plate.

10. The roof load carrier of claim 8, further comprising means on the bolt for preventing the bolt from being pulled out of the support foot due to the spring bias applied to the securing plate acting upon the bolt.

11. The roof load carrier of claim 8, wherein the support foot includes a cover over the bolt and the pin for security against access thereto.

12. The roof load carrier of claim 2, comprising two of the rails spaced parallel to each other extending on the roof of the vehicle; at least one of the transverse bars extends between the rails; and a respective support shoe and fastening device at each end of the transverse bar.

* * * * *